United States Patent [19]

Burke

[11] 3,878,371

[45] Apr. 15, 1975

[54] APPARATUS AND METHOD FOR COMPILING AND RECORDING OPERATING DATA ON EQUIPMENT

[76] Inventor: Harry E. Burke, 199 First St., Redwood City, Calif. 94022

[22] Filed: Feb. 7, 1973

[21] Appl. No.: 330,246

[52] U.S. Cl..... 235/92 PD; 235/92 NT; 235/92 MT; 235/92 R; 324/94

[51] Int. Cl................................................... G07c 3/10

[58] Field of Search......... 235/92 T, 92 EA, 92 CC, 235/92 MT, 92 PD, 92 NT, 92 CM, 61.11 R; 324/94

[56] References Cited

UNITED STATES PATENTS

| | | | |
|---|---|---|---|
| 2,851,596 | 9/1958 | Hilton | 235/92 TF |
| 3,436,530 | 4/1969 | Faude et al. | 235/92 PD |
| 3,500,342 | 3/1970 | Bissett et al. | 324/94 |
| 3,680,967 | 8/1972 | Engelhardt | 235/61.11 R |

*Primary Examiner*—Gareth D. Shaw
*Assistant Examiner*—Joseph M. Thesz, Jr.
*Attorney, Agent, or Firm*—Julian Caplan

[57] ABSTRACT

A recorder for mounting on a piece of equipment for recording data representative of one or more operating parameters of the piece of equipment. The recorder includes a relatively uncomplex pulse counting system which only counts the pulses that indicate variations in the operating parameter. The identity of the piece of equipment and of the operating parameter, which do not vary, is encoded on a machine readable indicia bearing member on the exterior of the recorder. In using the recorder and practicing the method, both the contents of the pulse counter and the identifying indicia are extracted and stored in data processing equipment in which information on which to base decisions regarding the piece of equipment is generated.

4 Claims, 10 Drawing Figures

APPARATUS AND METHOD FOR COMPILING AND RECORDING OPERATING DATA ON EQUIPMENT

This invention relates to a new and improved apparatus and method for compiling and recording operating data on equipment.

It is a principal feature of the present invention to provide apparatus to determine how equipment has been used. Typical of the equipment on which the apparatus may be installed are truck fleets, private- and government-operated passenger vehicle fleets, construction, mining and processing industry equipment. The data which is obtained from use of the apparatus is useful in the selection, deployment, servicing, cost accounting and operation of such equipment.

A feature of the invention is that the apparatus provides automatic means for collecting operating data from equipment and directly entering the data in digital computers. The collection of the data is inexpensive but reliable.

The data which is collected is of a variety of items. For example, let it be assumed that the apparatus is installed on a street sweeper. The apparatus will record how many times the ignition switch for the engine was turned on, how long it was turned on, how often the engine starter switch was closed, how often the sweeper brush motor was turned on, how long the brush motor was turned on, whether the engine at any time exceeded a predetermined speed, whether the engine oil temperature exceeded a selected temperature and how often it exceeded such temperature and the total time which it exceeded such temperature. Further, the readings of tachometer generators, thermal switches, pressure switches, proximity switches, etc., which have been installed on the vehicle are recorded. The invention is easily convertible to recording a variety of functions depending upon the type of equipment in which it is to be installed. One of the features of the invention is the facility with which a particular recorder can be converted for use on different types of equipment.

Another feature of the invention is that it assists in minimizing maintenance costs and maximizes the use of the equipment.

A principal purpose of the invention is to provide instruments and instrumentation systems which make it possible to gather needed data from one or many pieces of equipment. The invention employs a memory in the form of a pulse counter of which two types from a number of possibilities are disclosed in detail.

The invention affords recording without a time base, using existent switches as transducers, using events as units of measurement, and using event measurements as input data to algorithms set up in computer memory. These algorithms can be quite complex and form no part of the invention. It is even possible to write many business policies as algorithms based on event input data. These policies can be directed toward the operation of fleets of vehicles, their maintenance, etc.

An object of the present invention is to provide a data recorder unit that is sufficiently compact to permit one or more of the units to be mounted on a piece of equipment and to permit the units to be transported, after removal from the piece of equipment, to a central reading or data extraction station. The station is linked to data processing apparatus so that information from many of the units can be collated or otherwise converted into information useful for management, accounting, and/or maintenance decisions. The invention achieves this object by providing in a single casing permanent identification of the piece of equipment and of the parameter, and a pulse counter or memory cell that counts the number of events which define the variation of the parameter during the period that the unit is installed on the piece of equipment.

The character of the parameter is established by the type of transducer employed in the piece of equipment. The transducer can be an existent component in the piece of equipment or can be installed especially for data collection purposes. For example, a starter switch or solenoid on a motor vehicle constitutes a transducer indicative of the number of times the vehicle engine is started because an electric pulse is produced thereby each time the engine is started. The vehicle ignition switch constitutes a transducer for gating repetitive clock pulses to a counter if an indication of the duration of engine operation is desired. Equipment operating parameters manifested by nonelectrical phenomena can be sensed by installation of appropriate and conventional transducers.

The total number of pulses is compiled and recorded by any device which is capable of counting a given number of pulses of electric energy and capable of holding that number for an extended period of time. In this sense, counting is a form of recording.

In one preferred embodiment (first), using integrated circuit technology, it is possible to construct a counting network that is extremely small and consumes very little power. Such a network is here called a memory cell. Any number accumulated in a memory cell during a recording period can be held for recovery at some later time.

Such a cell will create one output, or reset pulse, each time it absorbs a full scale count of input pulses. A recorded number can be recovered by adding enough input pulses to obtain the reset pulse, and subtracting the number of input pulses from the known full scale count of the cell.

The recovery process can be used either to reset the cell to zero count, or to restore the recorded number in the cell after reading it out.

In another preferred embodiment (second) of the invention, "memory cells" which have been used for other purposes and which consist of a casing of one metal such as silver having a centrally disposed electrode of another metal such as gold and electrolyte within the casing and surrounding the electrode of ions the first metal (silver). When a constant plating current is passed between the casing and electrode, the amount of silver deposited on the gold electrode is a function of the time that the current is active. On the other hand, if the current is varied according to a time function, the amount of plated silver represents the functional-time integral of the variable current. Further, if the time function is in a number of pulses of current of known magnitude and width, the amount of silver plated represents the integral of the sum of the number of pulses. By deplating the silver from the gold electrode in a series of pulses and counting the number of pulses required to totally deplate the silver, the data can be read and the signals can be used as a direct input to a digital computer.

Memory cells can also be constructed using other techniques, such as magnetic cores, magnetic "bubbles", etc.

Whatever form of counter or memory cell is employed, it counts and stores a number of events that occur in the piece of equipment with which the apparatus and method of the invention is employed. The activities or operating parameters of the piece of equipment are easily described by event notation. The rotation of shafts, the movements of levers, the positions of components, etc. can all be specified in terms of events or pulses.

In defining the activities of a piece of equipment some events are a normal part of these activities while others might be considered operational aberrations. The normal events may be used to monitor the use of the piece of equipment while the aberrations can measure abuse.

Consider the operation of a vehicle. Significant use data might include the number-of-times the vehicle was used, the number of miles traveled, number-of-times gears were shifted, toatal time brakes were applied, cranking time, running time, etc.; while abuse data might include the time the engine was operated over rated speed, time engine overheated, time engine overloaded, number-of-times excessive braking pressure applied, number of emergency steering maneuvers, number of excessive accelerations from standstill, and the like.

This type of information can be used to control a maintenance program, support a spares inventory, verify application decisions, monitor operations and the like.

Electronic event recording is a powerful means for gathering large quantities of statistical data for entry to a computer programed for sophisticated statistical analyses. These analyses can have engineering, accounting, and mangagement objectives.

For example, in controlling the operations of a number of machines, a computer can be programed to analyze each individual machine's actual experience, as defined by events, and from this indicate how to accomplish a given business objective with a minimum capital investment and at a minimum operating cost.

Then, too, by placing event recorders on a large number of customer operated vehicles, a manufacturer can determine how his products are actually used and how they perform under this use. This information is a useful adjunct to the data gathered under artificially created test conditions.

Other objects of the present invention will become apparent upon reading the following specification and referring to the accompanying drawings in which similar characters of reference represent corresponding parts in each of the several views.

DESCRIPTION

Figure 1:
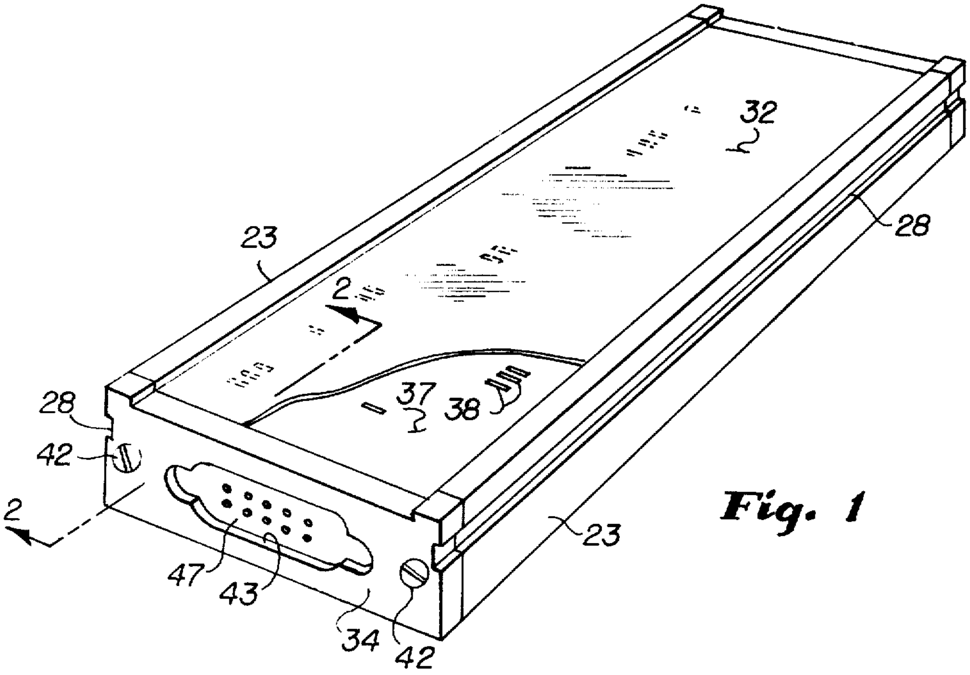
FIG. 1 is a perspective view of a recorder used in connection with the present invention, partly broken away to reveal internal construction.
Figure 3:
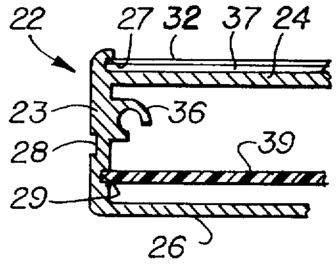
FIG. 3 is a fragmentary sectional view taken substantially along lines 3—3 of FIG. 2.
Figure 2:
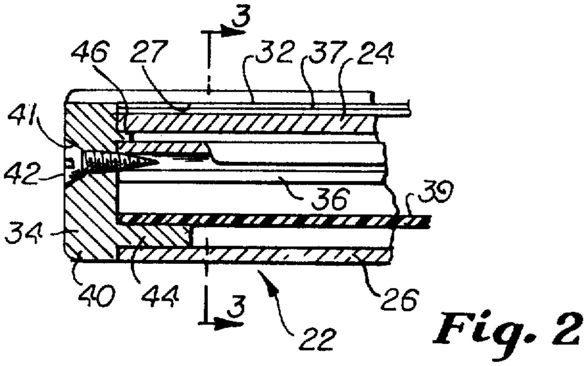
FIG. 2 is a fragmentary sectional view taken substantially along the line 2—2 of FIG. 1.

Recorder 21 shown in FIGS. 1-3 is intended for installation in a proper holder or receptacle (now shown) in a piece of equipment such as a motor vehicle having certain sensors or transducers installed therein and connected to said recorder. The recorder is intended to be slid into its holder and has a multipronged socket connector 47 to connect to the various sensors through a mating plug in the holder. One preferred construction of recorder 21 has a casing 22 (which may be an aluminum extrusion) having sides 23, a transverse, longitudinal top partition 24 and a bottom 26. Sides 23 extend above top partition 24 and internal grooves 27 are formed in the extensions of the sides to receive the edges of an IBM punch card 37 or like indicia bearing member and a transparent plastic protective top cover 32. External grooves 28 are formed in sides 23 to cooperate with holding means to accurately lock recorder 21 in position in a receptacle therefor in the piece of equipment (not shown). Internal grooves 29 are formed in sides 23 spaced upwardly from bottom 26 to receive a circuit-board 39 carrying various electrical components. Front and rear caps 33, 34 are provided for each end of casing 22. As one means of securing caps 33, 34 to casing 22, longitudinal split cylindrical inward protrusions 36 are formed on sides 23 below top partition 24. Each cap has an end 40 the same external dimensions as casing 22 and forms an end plug therefor. Countersunk holes 41 are formed in alignment with cylindrical protrusions 36 to receive cap screws 42 having threaded points which imbed themselves in protrusions 36 and secure the caps in place. End cap 34, is formed with a central opening 43 for access by a plug (not shown) into multipin socket 47 connected to the circuitry of the circuit board 39. For proper registry of each cap 34, 33, an inward extension 44 which lies against the inside of bottom 26 and against the insides of sides 23 is provided. Adjacent the top of each cap is an inward projection 46 extending substantially across the width of the cap which fits under the underside of top partition 24.

One cap 34 may be permanently secured, and the other 33 removable by screws 42 to provide access to the elements held within casing 22. It will be understood that instead of casing 22, a U-shaped casting may be used formed with one permanent end cap 34.

A common type of punch card 37 used in IBM equipment is an extremely inexpensive method of storing 80 digits of information and is secured to the external surface of casing 22 so that the data on the card is accessible externally.

It may be read by a number of different ways and it may be either handpunched or prepared automatically as a computer output record. The card 37 is prepunched to designate what the information which is to be stored in each channel of the recorder will represent, such as the identity of the piece of equipment and of the parameter or event being measured. The card 37 in one of the components of the recorder and may be viewed through the transparent top cover 32 in its entirety. If read by mechanically sensing contacts, the card is oriented in a reader with enough accuracy to be sure that the sensing springs of the reader line up with the holes 38 in the card. The reference grooves 28 determine this alignment and grooves 27 and the end caps 33 and 34 hold the card in place with close tolerances.

FIRST MODIFICATION

Figure 4A:
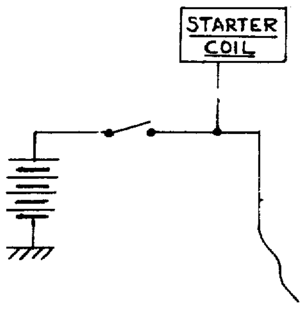
FIG. 4 is a block diagram of the electrical components of one modification of the invention. (First)
Figure 4B:
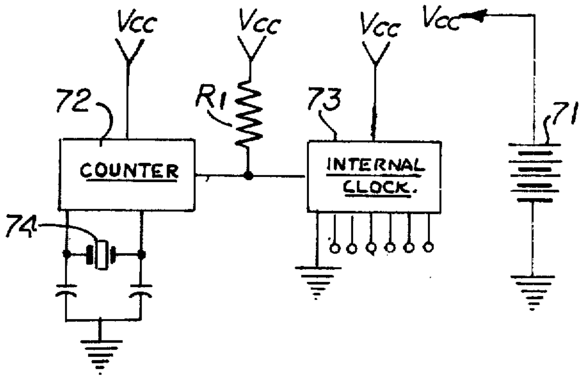
Figure 5:
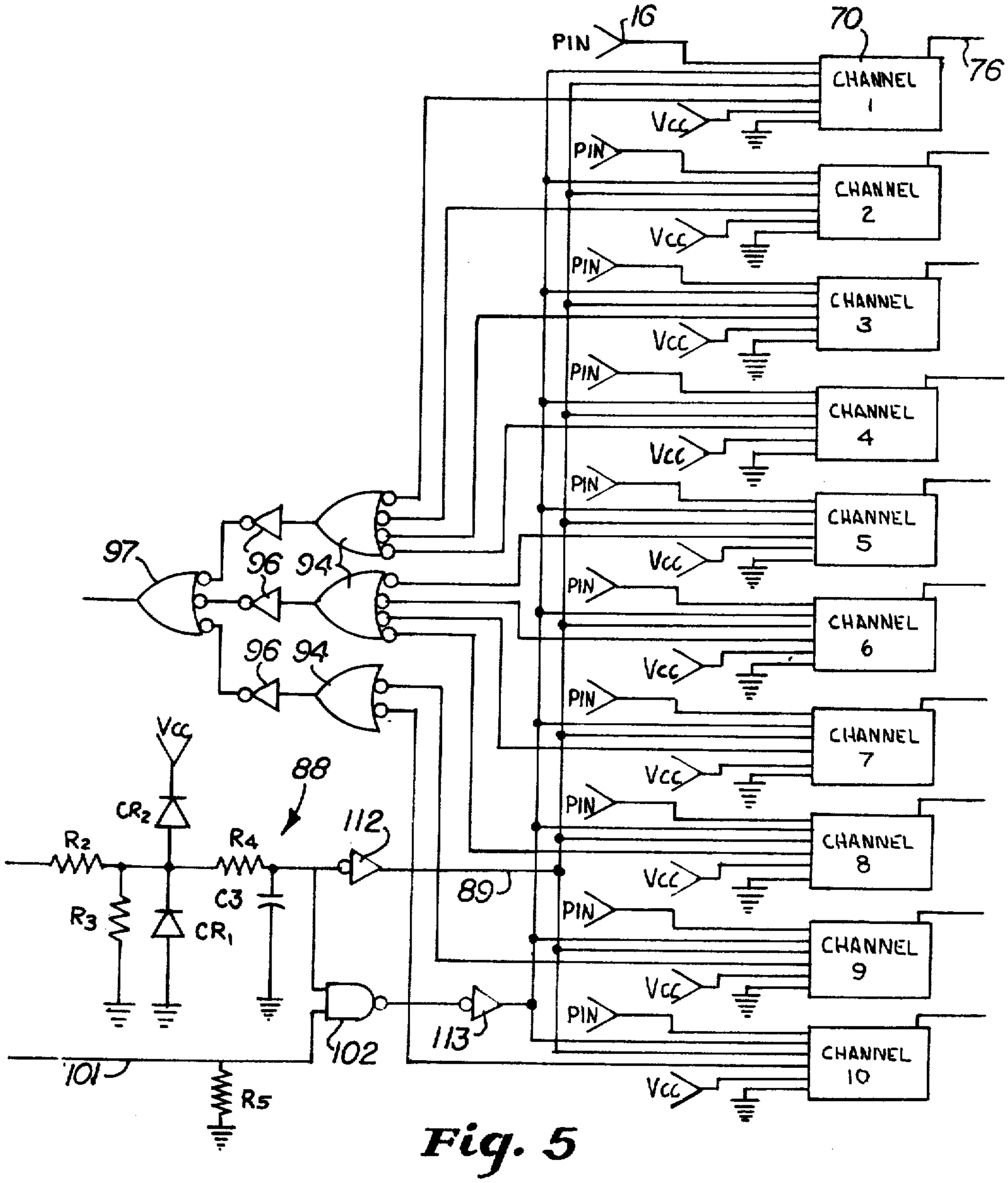
FIG. 5 is a schematic wiring diagram of the recorder of FIG. 4.

A digital recorder or counter is shown in FIG. 5 consisting of 10 channels 70 which are substantially identical, the number being subject to variation. In each of the channels either the number of times an event occurs or a number representing the length of time an event occurs is stored. The circuits of FIG. 5 are energized by those of FIGS. 4A–4B. FIG. 4A is a typical input circuit external to the recorder, while FIG. 4B is an internal circuit which may be used to determine whether a channel of FIG. 5 records numbers of time or lengths of time. A source of internal power 71 is provided which energizes many of the components of the system. In some usages of each channel a pulse generator 72 and an internal clock 73 are used. Pulse generator 72 is controlled by a crystal 74 and drives clock 73. The internal stages of the clock 73 are available to give clock frequencies of different rates between the frequency of the crystal 74 and clock 73 output frequency, clock 73 having plural output terminals 79 for this purpose. The particular clock frequency desired for each channel recording length of time can be jumperwired to each channel at terminal 76, as hereinafter described. This permits the time scale for each channel to be selected individually.

As each of these pulses is individually counted by a memory cell, the clock pulse frequency must be low enough so that the number of pulses used to measure a maximum length of time is less than the capacity of the cell.

For a recording period as long as almost three months, the maximum clock rate would be one pulse every fifteen minutes using a thirteen bit memory cell. The same cell used for an eight hour audit period would accept a clock pulse every four seconds.

Figure 6:
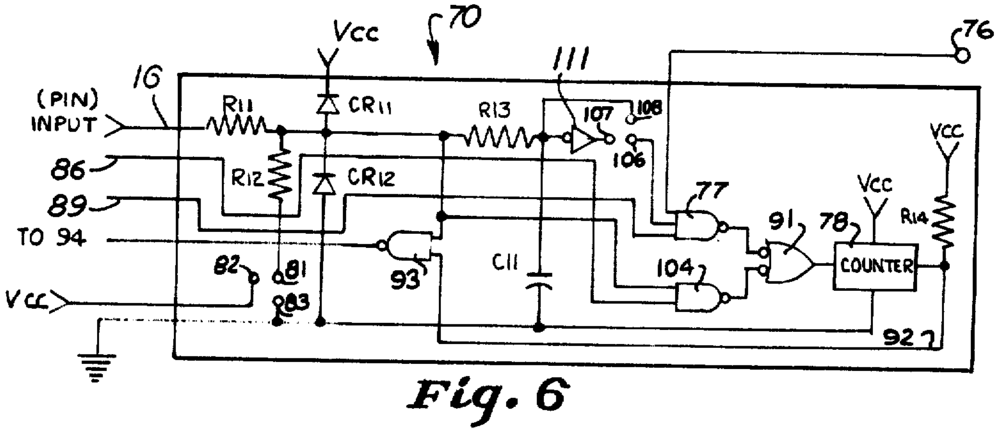
FIG. 6 is a schematic wiring diagram of one of the channels of FIG. 5.
Figure 7:
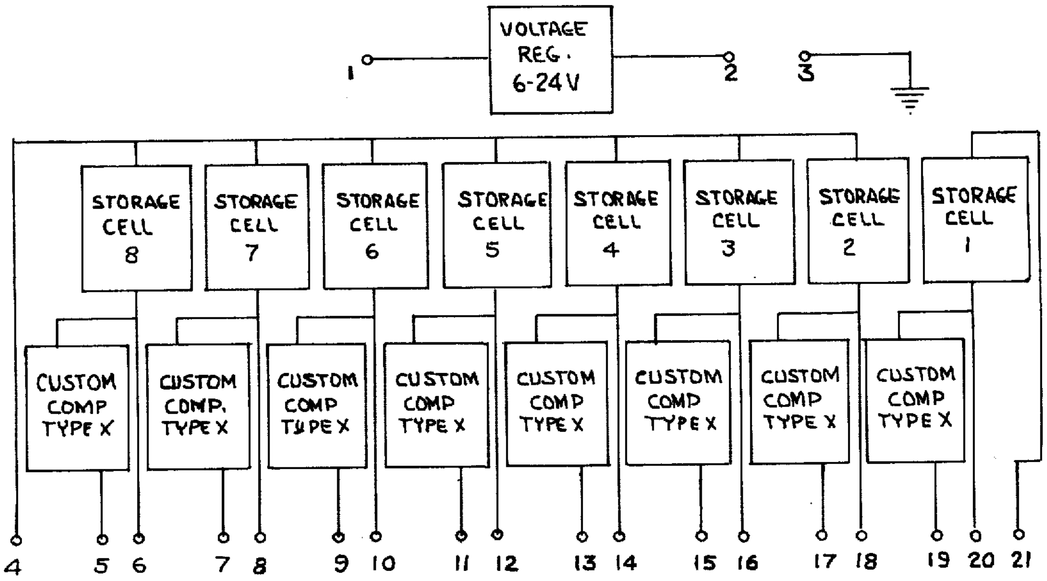
FIG. 7 is a block diagram of another modification. (Second)

As shown in FIg. 6, each channel has filter components which comprise a voltage clipping polarity determining circuit R11, R12, CR11, CR12 and a resistor-capacitor filter R13, C11. The combination of the clipping circuit and filter provides a data input to a recording input gate 77 which will recognize as valid data only a signal which is present for a fixed minimum time (as determined by capacitor C11). Excessive signal input voltage will not reduce the minimum time for recognition. It will be understood that the signals which are being recorded may be either positive going or negative going. If they are negative going, elements CR11 and CR12 after filter R11, R12 function as an invertor to provide proper signal polarity to gate 77 and counter 78. This combination is reliable in operation with a positive or negative grounded power supply and with positive or negative going signals upon proper placement of two jumper wires connecting terminal 81 to either of terminals 82 or 83 and terminal 106 to either of terminals 107 and 108, respectively.

Recording input gate 77 has one of its inputs connected at terminal 76 either to the internal supply 71 (e.g. 4 volts) or to one of the leads 79 of the internal clock. When the recording input gate 77 is connected to internal supply 71 (through 76), counter 78 registers a number of times the input signal is applied. When recording input gate 77, on the other hand, is connected to internal clock 73 (through 76) counter 78 registers a number corresponding to the length of time the input signal is present. Thus the source of an input signal is illustrated diagramatically in FIG. 4A wherein there is shown the battery 11 of the engine of a vehicle, starting switch 12 and wire 13 which leads to a starter coil. Connected to wire is a lead 14 to the input pin 16 of channel 1.

Connected to each of the channels is a readout enable circuit 88 (FIG. 5) consisting of a filter comprising elements R2, R3, R4, CR1, CR2, and C3 for screening unwanted noise which is connected through inverter 112 over connection 89 to the recording input gate 77 of each channel. When all of the inputs of the recording input gate 77 are positive, then, by operation of OR gate 91 (FIG. 6) the counter 78 is energized. When the capacity of counter 78 is exceeded, through lead 92 a signal is transmitted to readout complete gate 93 for the channel, then to one of the OR gates 94 (FIG. 5), thence to one of invertors 96, thence to readout complete gate 97.

An external oscillator (not shown) is connected through wire 101 to NAND gate 102 thence through invertor 113 through line 86 to readout input gate 104 for each of the channels. This creates pulses through counter 78 which are counted to determine by subtraction the difference between the pulses which have previously been counted by the counter 78 and the capacity of counter 78.

OPERATION OF FIRST MODIFICATION

With all the counters 78 at zero, the recorder 21 is connected to a number of different sensors such as exemplified by starter switch 12 in the vehicle under test. It is first determined whether the signals or these sensors are negative going or positive going and a jumper wire is connected between terminal 106 of gate 77 and either 107 or 108 accordingly. Similarly, depending whether the supply battery 11 of the vehicle is positive or negative grounded, terminal 81 is connected by a jumper wire to either of terminals 83 or 84. Further, terminal 76 is connected either to the power supply, if the number of times which a sensor 12 is energized is to be recorded, or to one of the terminals 79 of internal clock 73, if the total time of energization of the sensor is to be recorded. In the latter event, the particular internal clock terminal 79 which is selected depends upon the projected total time for the period of the recorder's operation.

Referring to FIG. 4, if starter switch 12 is connected by lead 14 to input 16 and terminal 79 of the internal clock is connected to terminal 76, counter 78 will count clock pulses the number of which represents the duration of closing of the starter switch until the capacity of the counter 78 is exceeded. Similarly, each time switch 12 is closed, assuming that terminal 76 is connected to supply 71, counter 78 records the number of closures which occur during the test period. In the event that the capacity of counter 78 should be exceeded through some happenstance, the counter will reset to zero and start counting over again.

In order to read out the data in each counter 78, recorder 21 is removed from the piece of equipment and transported to a data extraction station. At the data extraction station, the recording input gate 77 is disabled (through readout enable circuit 88) and the readout input gate 104 and readout complete gate 93 for each channel are enabled individually by signal applied to the data input of the channel being interrogated. The recorded data is readout by an external oscillator and counter (not shown, but connected by lead 101). The external oscillator drives the counter through the full count back to zero. The counter produces an overflow signal on the transition from the full count to zero. This is the readout complete signal and is used to stop the oscillator in the readout equipment. An external counter tied to this oscillator, preset to enter channel 1 full scale and counting backward, now displays the number stored in the recorder. The recorder channel is now clear of old data and ready to accept new data.

The number stored in each memory cell of the recorder is periodically placed into a conventional buffer memory external to the recorder. This buffer memory may be a standard MOSFET array, commercially available. The format of the data in the buffer memory is arranged to meet EIA Standard Specifications RS-23-2-C, which means that the buffer memory can be read by any one of a number of commercial devices including punched paper tape recorders, magnetic tape recorders, acoustic couplers, modems, minicomputers, large computers and page composers reading into tabulators. The circuits to transfer from the counter to the buffer memory may be conventional.

In recovering the stored information in the counters 78, card 37 is read and its data fed into the buffer memory by any convenient means such as an optical or mechanical card reader thereby to identify the data extracted from the counters.

The input filter in circuit 88 prevents noise signals from falsely triggering the recorder into the readout mode. A signal on the readout enable line disables the recording gates and enables the readout circuitry. The gate 97 driving the readout complete line combines all readout complete signals by use of only one connector pin in connector socket 47.

As a sub-modification of the preceding modification, special channels may be substituted for standard channels. One such channel would, on command, record a binary number presented in parallel form at the input connector.

The components of the system are subject to some modification. Suitable components are as follows:

Counter 72, 78 — Intersil SP 7028 B Electronic clock

Clock 73 — RCA CD 4020 A, 14 stage ripple-carry type counter

Gates 111, 104, 91, 93, 96, 112, 102, 113 — RCA CD 4011 A

Gates 94, 97 — RCA CD 4012 A

Gate 77 — RCA CD 4023 A

| | | | |
|---|---|---|---|
| R 1 | 10 meg | C 1 | 20 mf |
| R 2 | 100 K | C 2 | 20 mf |
| R 3 | 33 K | C 3 | 1000 micro f |
| R 4 | 1 meg | C11 | 1000 micro f |
| R 5 | 1 K | | |

-Continued

| | | | |
|---|---|---|---|
| R11 | 100 K | CR 1 | 1N 4454 |
| R12 | 33 K | CR 2 | 1N 4454 |
| R13 | 1 meg | CR11 | 1N 4454 |
| R14 | 10 meg | CR12 | 1N 4454 |

SECOND MODIFICATION

A second modification is shown in FIGS. 7 to 10.

Figures 8, 9, 10:
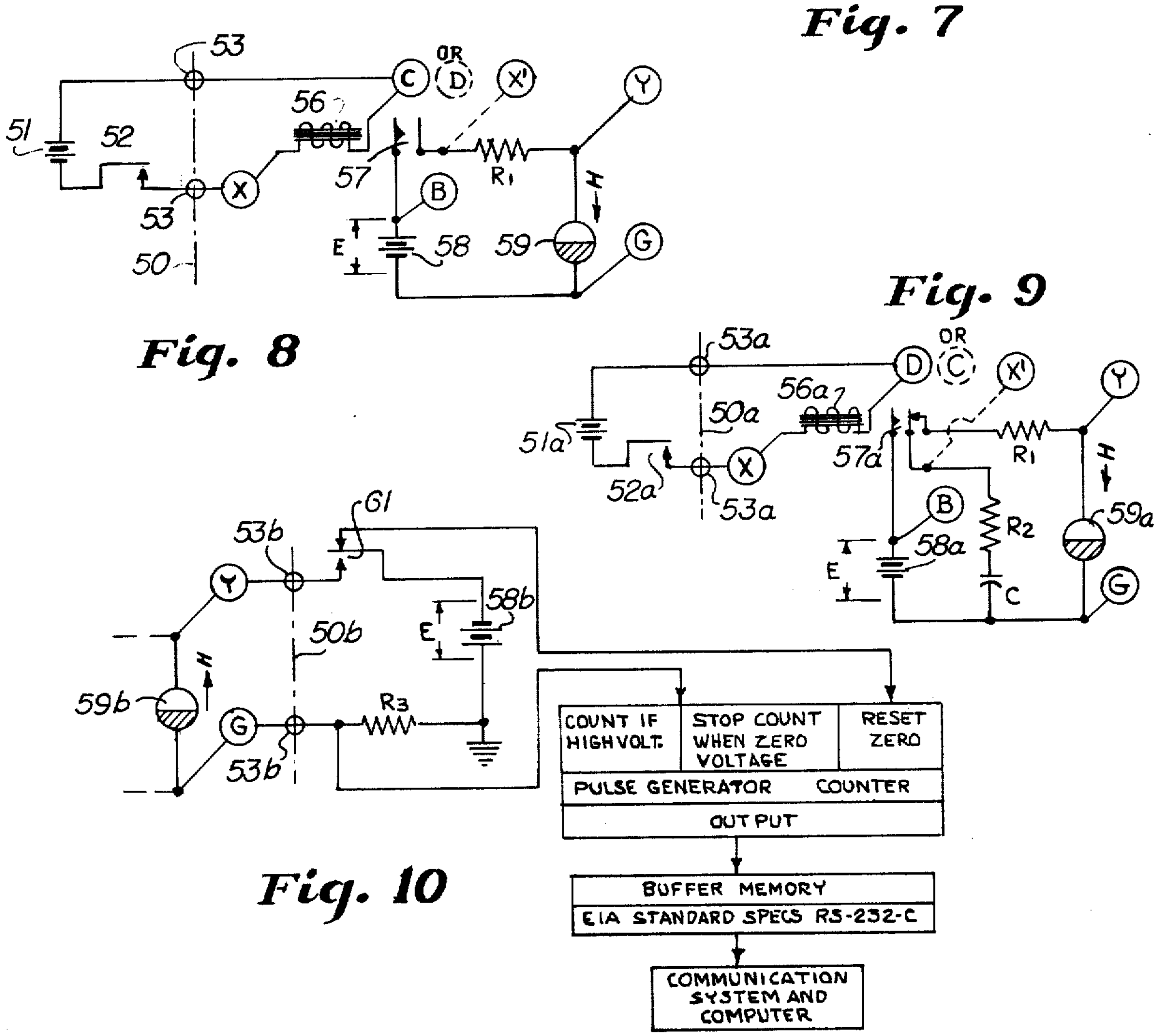
FIG. 8 is a schematic wiring diagram showing one typical circuit for recording the duration of closing of a sensor switch of the modification of FIG. 4.
FIG. 9 is a diagram similar to FIG. 8 for recording the number of times of closing a sensor switch.
FIG. 10 is a combined block and schematic wiring diagram showing typical circuitry for reading the recorder in accordance with FIG. 4.

Referring to the typical circuit in the modification of FIG. 8, the portion of the circuit to the left of line 50 represents components on a piece of equipment, such as a vehicle or machine, while those on the right are in the recorder 21. The piece of equipment contains a battery 51 and a representative sensor is designated as switch 52, such sensors being of various kinds, as has been described. A memory cell, heretofore defined, functions to record the length of time switch 52 is closed during a recording period. When the switch 52 is closed, the voltage of external battery 51 is used to energize coil 56 to close the contacts 57 of the relay, which is an isolating relay and is used because of the questionable regulation of the external battery 51. An internal battery 58 is used as a source of recording power because any variation in recording voltage "E" is an error in the record. By using an internal battery 58, it is possible to maximize the voltage regulation hence the accuracy of record. Contact points 53 represent the connection between the recorder 21 and switch 52 and battery 51 in the piece of equipment.

The circuit point labeled either "C" (FIG. 8) or "D" (FIG. 9) represents two busses inside of the recorder. Busses are used to minimize the number of contacts needed in the connectors between the piece of equipment and the recorder. Two busses are needed because the switch 52 might be either between the external battery voltage and "C" or between the external ground and "D". Switch 52 then closes circuit point "X" through the external battery 51 to either ground or the external battery voltage.

Where an external battery 51 is not available, the circuit point "X$^1$" is connected to "X" internally and the switch 57 is closed between "X" and "B", "B" being the internal battery 58 voltage. In these circumstances, the isolating relay 56 can be eliminated.

As soon as the contacts of relay 57 are closed by energization of coil 56, current will flow into the memory cell 59 through resistor "$R_1$". This current flowing for a time period represents a total of charge stored in memory cell 59. As has hitherto been mentioned, the memory cell 59 is a commercially available device having a silver casing in which is centrally located a gold electrode. A silver ion electrolyte fills the space between the casing and the electrode. Passage of a current causes silver to plate onto the gold electrode, the quantity of silver plated being a function of current and time. The amount of charge (silver) stored is proportional to the internal battery voltage "E", to the magnitude of the resistance "R" and to the length of time the relay contacts 57 are closed. By regulating "E" with care and choosing a particular value of "$R_1$", it is possible to have the amount of charge stored be proportional to the length of time the contacts are closed. For maximum accuracy of record, it is desirable to have the order of magnitude of charge stored be the same regardless of what time the stored charge represents and the values of "E and "R" are chosen to achieve this.

"$R_1$" controls the scale factor of the transfer function of time-to-stored-charge. "$R_1$" is then chosen to provide the desired stored charge to represent the anticipated time to be stored.

Circuit point "B" is the battery buss brought out to the connector 47 in order to be able to check the condition of the internal battery each time the instrument is used and Circuit point "G" is the ground point of the recorder.

"G" may be connected to either "C" or "D" if desired —externally.

FIG. 9 illustrates a typical circuit to record the number of times switch 52*a* is closed rather than the total time it remains closed during an account period. Switch 52*a* may be the same as switch 52 or a different switch. Many of the components of FIG. 8 are substantially the same as in FIG. 9 and the same reference numerals followed by the subscript *a* are used to designate corresponding parts.

When switch 52*a* is closed, a voltage of battery 51*a* energizes coil 56*a* to close the relay contacts 57*a* in the recorder. The relay is an isolating relay which is used because of the questionable regulation of the external battery 51*a*. Where external battery 51*a* is not available, the isolating relay 56*a* is eliminated. The circuit point "X'" is connected to "X" and the circuit points "B", "X" and "Y" replace the contacts of relay 57 respectively and the circuit action is essentially the same. ("$R_1$" can be supplied externally in these circumstances.)

When switch 57*a* is activated, the internal battery voltage "E" is connected in series through the resistor "$R_2$" and the capacitor "C". (The capacitor will then accumulate an amount of charge "Q" in a period of time which is at least five time constants "RxC"). The five time constants, "$R_1 \times C$", represent the necessary dwell time, or the time switch 57*a* must be activated in order to assure full charge transfer into the capacitor "C".

When the relay 56*a* is deactivated, the charge accumulated in capacitor "C" will be transferred into the memory cell 59*a* through "$R_1$" and "$R_2$" with the new time constant ("$R_1$" + "$R_2$") × "C". As long as the relay remains deactivated for at least five times the new time constant, the full charge will be transferred from "C" to memory cell 59*a*. The amount of charge stored each time the relay is activated is entirely a function of the internal battery voltage "E" and the size of the capacitor (or accumulator) "C". In this case, "$R_2$" determines how long it takes to charge the accumulator "C" and it determines the maximum current drained from battery 58*a* in order to accomplish this. "$R_2$" and "$R_1$" determined how long it takes to transfer the charge and also determines the maximum current used to accomplish the charge transfer. The maximum currents in both of the above circumstances must be kept below some figure determined by design if the maximum accuracy is to be achieved in the record. Also, for maximum accuracy of record, it is desirable to have the order of magnitude of the amount of charge stored by the same regardless of what number of times the charge stored represents. "C" is then chosen to provide the desired stored charge to represent the anticipated number-of-times to be stored.

The accuracy of such a time measurement depends on the stability of the clock pulse frequency and the length of time between two adjacent pulses.

Referring to FIG. 10, a combination block and circuit diagram shows one typical reader or data extraction station for the second type of recorder. The recorder components are to the left of line 50*b*, the reader components to the right. Cell 59*b* can be either cell 59 of FIG. 8, cell 59*a* of FIG. 9 or any equivalent cell in equivalent circuits. The switch 61 is activated and held down. Starting from zero, the counter counts the pulses from the pulse generator until the time elapses during which the charge is recovered from cell 59*b*. At that point, the voltage across the cell 59 increases and the count is stopped. The count in the counter is then a digital presentation of the charge which was stored in cell 59*b*. When switch 61 is released, the counter is reset to zero and is ready to read the charge of the next storage cell 59*b*.

In either case of storing numbers-of-times (FIG. 8) or lengths-of-times (FIG. 9) the digital output of the counter, whatever this happens to be, is related to a calibrated signal which was previously stored and then read back and stored in the memory of a digital computer or punched into an IBM card.

OPERATION OF SECOND MODIFICATION

Various sensors 52 are installed on the piece of equipment and wires therefrom are wired into a multi-pin connector in the holder in the piece of equipment which receives the recorder 21. A recorder 21 has been made up to suit the conditions of the vehicle. Thus, various custom components and memory cells 59, 59*a*, 59*b* are attached to board 39 and their terminals are wired to a multi-pin connector. Thereupon, the recorder is calibrated by test equipment which tests the plating and deplating of the memory cells 59, 59*a*, 59*b* and calibrates the same. A punch card 37 is punched with holes 38 for identification of the vehicle and other data as has been explained and also with holes 38 which are specific to and identify the particular components which are installed in the recorder and the operating parameters of interest.

Recorder 21 is then installed in the vehicle so that the plug connector is connected into the holder. As various events occur in the operating parameters in the piece of equipment, the various cells 59, 59*a*, 59*b* are plated either at constant current while the events are occurring or, where the purpose of the recording of information is to count the number of times an event occurs a pulse of limited but specific duration and specific current is applied to a cell 59. The recorder 21 is left in place for a pre-selected period of time, such as one shift or any other time interval within the capabilities of the memory cells. Thereupon, the recorder 21 is removed and read. The indicia on card 37 can be read optically through the transparent cover 32 or cover 32 can be removed making it possible for reader springs to enter the various holes 38 in the card 37. The holes 38 in card 37 identify the piece of equipment, the operating parameters and the calibration data. Some of holes 38 identify the piece of equipment and give data to the computer of such nature. Other holes give calibration data which affect the reading of the quantity of plating on the cells 59.

Thus it will be seen that the present invention provides a compact apparatus and an efficient method for storing data pertaining to various operating parameters in a piece of equipment. The amount of data that is compiled and recorded is minimized by non-varying information, pertaining to equipment and parameter identity and recorder calibration, is presented on a permanent, externally accessible medium, such as a punched card secured to the casing that houses the recording apparatus. The efficiency of the data recording apparatus and methods makes possible efficient acquisition of information on which to base decisions regarding equipment cost, deployment and maintenance.

Although two embodiments of the invention have been shown and described, it will be obvious that other adaptations and modifications can be made without departing from the true spirit and scope of the invention.

What is claimed is:

1. Apparatus for compiling and recording operating data of a plurality of different operating parameters of a piece of equipment, a first said parameter being duration of operation of a function of said equipment, a second said parameter being the number of times an operation of a function of said equipment occurs, the piece of equipment including a plurality of transducers corresponding to each of said parameters for generating electric pulses each time each of said operating parameter operates, said apparatus comprising a casing having an outer surface and a central cavity and being adapted for removable mounting on the piece of equipment, means on the outer surface of said casing for positioning a computer punch card punched to identify the piece of equipment and each of said operating parameters, means disposed within said cavity comprising a plurality of channels, each said channel having a circuit for counting and storing pulses from one of said transducers, said casing having a plurality of externally accessible terminals for effecting inter-connections between said counting means and said transducers so that said casing can be periodically removed from the piece of equipment to permit readout into a computer of the indicia on said punch card and said terminals further being interconnectable with computer readout means and each said channel having means to effect readout by said computer readout means of each of the numbers stored in each of said counting means, at least one said pulse counting and storing means comprising an AND gate having at least first and second input terminals and an output terminal, one of said transducers being connected to said first input terminal, a clock pulse generator connected to said second input terminal, and a counter connected to said second input terminal, and a counter connected to said output terminal so that the contents of said counter is representative of the time duration that the parameter operates.

2. Apparatus according to claim 1, wherein said pulse storing and counting means comprises a plurality of binary elements arranged in cascade to form a binary pulse counter.

3. Apparatus according to claim 1 wherein said pulse storing and counting means comprises at least one cell having first and second electrodes formed of dissimilar materials and being adapted to transfer the material of said first electrode to said second electrode at a predetermined rate in response to current flow between said electrodes.

4. Apparatus for compiling and recording operating data of a plurality of different operating parameters of a piece of equipment, a first said parameter being duration of operation of a function of said equipment, a second said parameter being the number of times an operation of a function of said equipment occurs, the piece of equipment including a plurality of transducers corresponding to each of said parameters for generating electric pulses each time each of said operating parameter operates, said apparatus comprising a casing having an outer surface and a central cavity and being adapted for removable mounting on the piece of equipment, means on the outer surface of said casing for positioning a computer punch card punched to identify the piece of equipment and each of said operating parameters, means disposed within said cavity comprising a plurality of channels, each said channel having a circuit for counting and storing pulses from one of said transducers, said casing having a plurality of externally accessible terminals for effecting inter-connections between said counting means and said transducers so that said casing can be periodically removed from the piece of equipment to permit readout into a computer of the indicia on said punch card and said terminals further being interconnectable with computer readout means and each said channel having means to effect readout by said computer readout means of each of the numbers stored in each of said counting means, a pair of parallelly spaced apart side members, said side members defining confronting pairs of upper and lower slots, opposed edges of said punch card fitting within said upper slots, a circuit board disposed in said lower slots said circuit board carrying said pulse storing and counting means, a pair of end caps spanning opposite ends of said side members and supporting said side members in operative relation, at least one of said end caps being removable to afford access to said circuit board and the means carried thereby, said punch card being readable without removal from said casing, a connector socket disposed in one of said end caps and having a plurality of electric terminals affording the sole connection to said pulse storing and counting means.

* * * * *